United States Patent
Yao et al.

[11] Patent Number: 6,047,456
[45] Date of Patent: Apr. 11, 2000

[54] METHOD OF DESIGNING OPTIMAL BI-AXIAL MAGNETIC GEARS AND SYSTEM OF THE SAME

[75] Inventors: Yeong-Der Yao, Taipei; Chia-Ming Lee, Taipei Hsien; Shyh-Jier Wang, Hsinchu Hsien; Der-Ray Huang, Hsinchu, all of Taiwan

[73] Assignee: Industrial Technology Research Institute, Hsinchu, Taiwan

[21] Appl. No.: 08/994,644

[22] Filed: Dec. 19, 1997

[30] Foreign Application Priority Data

Apr. 2, 1997 [TW] Taiwan ................................. 86104245

[51] Int. Cl.⁷ .................................................. G01M 1/00
[52] U.S. Cl. .................................... 29/407.05; 29/407.09; 74/DIG. 4
[58] Field of Search ........................ 29/407.05, 407.09, 29/407.1, 893, 893.37; 74/412 R, DIG. 4

[56] References Cited

U.S. PATENT DOCUMENTS

| | | | |
|---|---|---|---|
| 2,548,373 | 4/1951 | Hurvitz | 74/DIG. 4 |
| 3,085,407 | 4/1963 | Tomlinson | 74/DIG. 4 |
| 3,730,488 | 5/1973 | Gardner, Jr. | 259/67 |
| 3,936,683 | 2/1976 | Walker . | |
| 4,196,639 | 4/1980 | Spodig | 74/210 |
| 4,232,535 | 11/1980 | Caldwell | 64/28 M |
| 4,850,821 | 7/1989 | Sakai | 417/420 |
| 5,013,949 | 5/1991 | Mabe, Jr. | 310/83 |
| 5,204,572 | 4/1993 | Ferreira . | |
| 5,569,967 | 10/1996 | Rode | 310/103 |

*Primary Examiner*—David P. Bryant
*Assistant Examiner*—Essama Omgba
*Attorney, Agent, or Firm*—Finnegan, Henderson, Farabow, Garrett & Dunner, L.L.P.

[57] ABSTRACT

A method for designing an optimal bi-axial type of magnetic gear system that uses magnetic coupling for transmitting torque in order to be free from the defects caused by using a conventional mechanical gear system. A non-coaxial rather than a conventional coaxial type of magnetic gear design is considered for this invention. For the non-coaxial magnetic gear system, the size of torque will depend on the number of poles magnetized out of the strong magnetic material around the magnetic gear. Therefore, the optimum number of magnetized poles must be carefully selected for a set of specified conditions such that the largest torque can be obtained. An optimal magnetic gear system can be produced by the method in this invention.

11 Claims, 5 Drawing Sheets

METHOD OF DESIGNING OPTIMAL BI-AXIAL MAGNETIC GEARS AND SYSTEM OF THE SAME

BACKGROUND OF THE INVENTION

1. Field of Invention

The present invention relates to a non-axial type of magnetic coupling transmission system. More particularly, the present invention relates to an optimization method for a bi-axial magnetic gear system.

2. Description of Related Art

Gravitational force, electric force and magnetic force are three natural forces that can act at a distance. Through recent advances in the science field, not only has more knowledge been gained about the above physical phenomena, but also use of their characteristic properties has been applied in beneficial technical applications. Considering the use of magnetic forces, related technologies such as magnetic levitation and magnetic bearings are growing. Many practical applications for the magnetic forces are known including magnetically levitated trains, hydrodynamically operated machines, and so on. Conventional mechanical gears that are normally used in machines also have a magnetic counterpart in the magnetic gears. (refer to U.S. Pat. No. 3,936,683).

There are a number of advantages in using magnetic gears over the conventional mechanical gears. For example, mechanical gears can generate much vibration and noise during operation, whereas magnetic gears significantly reduce such vibration and noise. Furthermore, the rotating gears need lubrication and inspection for wear and tear from time to time. Therefore, if the gears can operate in a non-contact fashion, all those problems caused by friction, wear, vibration and noise disappear. Moreover, such non-contact gears are almost maintenance-free.

A magnetic gear system has at least the following advantages over the conventional mechanical gear system, namely:

1. Non-contact operation: can eliminate problems due to friction and wear, thus resulting in a longer life, easy maintenance, and great reduction of noise and vibration.
2. Operation in special environments: no lubrication is needed; therefore, it can be used in a vacuum, a dust free chamber or an environment filled with uncommon gases.
3. Potential for future development: with advances in electrical and mechanical engineering technologies, the range of applications for magnetic gear system is unlimitedly increasing.

Principally, magnetic gears operate through the interaction of magnetic field set up between two magnetic gears, and torque is transmitted by their mutual attraction and repulsion due to a magnetic coupling. Most conventional magnetic gear systems are designed for the coaxial type, because large torque can be transmitted. (e.g., U.S. Pat. No. 5,204,572 shows coaxial magnetic rings for load transmission.) An attempt has also been made to replace one of the magnetic rings with an electromagnet in order to attain a higher magnetic coupling. Because the magnetic coupling is achieved by the action of an electromagnet, problems, such as winding space and control current, must also be considered. Therefore, this type of magnetic gear design becomes rather complicated.

Nevertheless, since the torque transmitted through a coaxial magnetic gear system is provided by mutual interactions involving all the magnets in the two magnetic rings, a large torque can be transmitted by the coaxial magnetic system. In a non-coaxial gear system, only a few of the neighboring magnets are involved in the mutual interactions, hence weakening the resulting torque. However, due to directional restrictions of a coaxial type of magnetic gear transmission system, non-coaxial type of magnetic gear transmission system cannot be completely replaced with the coaxial type. Furthermore, the recent advances in the material research have produced a number of powerful magnets, such as a strong magnetic compound known as neodymium iron boron (NdFeB). Therefore, non-coaxial magnetic gear systems have practical value.

SUMMARY OF THE INVENTION

Accordingly, the present invention is directed to provide a bi-axial type of magnetic gear system using strong magnetic material, and a method of finding the optimum number of magnetized poles in a magnetic gear to give the largest possible torque by varying the controlling parameters that affect the size of the torque. Subsequently, the optimal design is applied to the fabrication of a magnetic gear system.

To achieve these and other advantages and in accordance with the purpose of the invention, as embodied and broadly described herein, the invention provides a method for designing an optimal bi-axial type of magnetic gear system, comprising the steps of providing a non-coaxial magnetic gear system that includes at least two magnetic gears having a hard magnetic material; then, setting a distance between the magnetic gears and a ratio of an external ring radius of the magnetic gear over the thickness of a hard magnetic material layer; next, casting a magnetic conducting material layer on an internal perimeter of the magnetic gears; thereafter, drawing a series of magnetized pole number versus torque curves each having a peak value by varying the thickness of the magnetic conducting material layer; then, optimizing the magnetic gears to obtain the optimal torque by magnetizing the optimal number of magnetic poles on the magnetic gear; and varying a distance between the magnetic gears and a ratio of the external ring radius over the thickness of the hard magnetic material layer separately, and then repeating the procedures from casting the magnetic conducting material layer to optimizing the magnetic gears to obtain optimal torque as described above.

In another aspect, a bi-axial type of magnetic gear system comprises at least two transmission shafts each supported by a bearing enclosed within a base plate. At least two magnetic gears having a hard magnetic material slide into one of the transmission shafts for transmitting torque, and each magnetic gear includes a magnetic ring and a magnetic conducting material layer. The magnetic conducting material layer is formed by casting magnetic conducting material into the internal perimeter of the magnetic ring, and is located spatially between the magnetic ring and the transmission shaft. The magnetic ring is constructed by casting hard magnetic material and then magnetized with an optimum number of magnetic poles to obtain the optimal torque according to an analysis of the factors affecting the torque.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
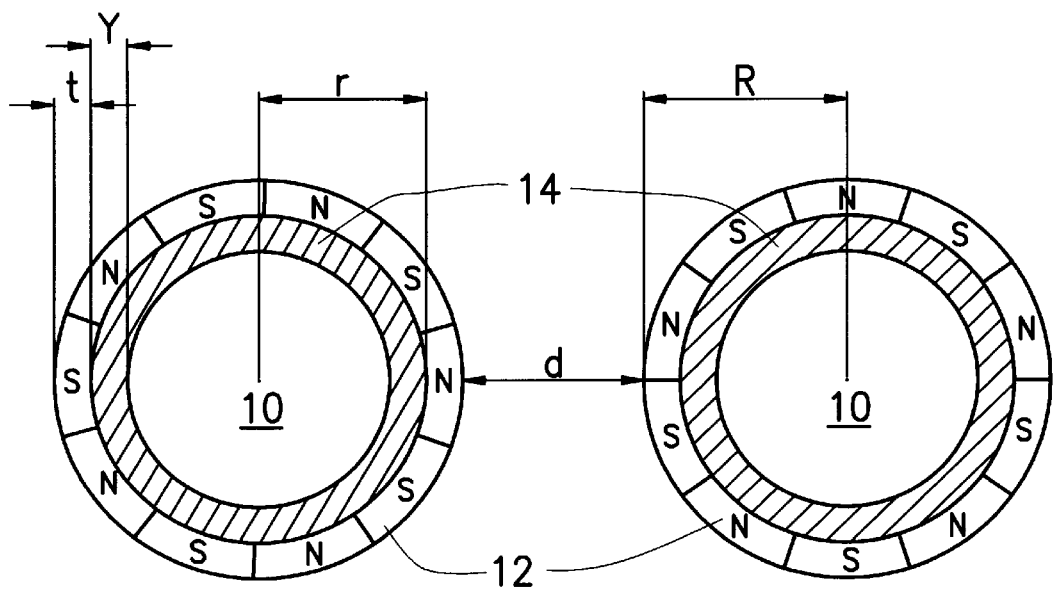
FIG. 1 is a front view of an bi-axial type of magnetic gear system showing the measurements of various parameters.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a frontal view of a bi-axial type of magnetic gear system depicting various parameter dimensions. As shown in FIG. 1, the parameters that determine the magnitude of torque T in a bi-axial magnetic gear system, in general, include the gear distance d between magnetic gears 10, thickness t of a magnetic material layer 12, thickness Y of a magnetic conducting material layer 14, the number M of magnetized poles (the total number of N and S poles in a magnetic gear as shown in FIG. 1), an external ring radius R of the magnetic material layer 12 and an internal ring radius r of the magnetic material layer 12.

In a system with two magnetic gears 10, each having the same ratio R/t of external ring radius over the thickness of the magnetic conducting material layer 14, the same thickness Y of magnetic conducting material layer 14, and the same number M of magnetized poles. In other words, the torque transmitted between the two gears 10 is defined by the functional relation, T=f(d, Y, M, R/t).

Figure 2:
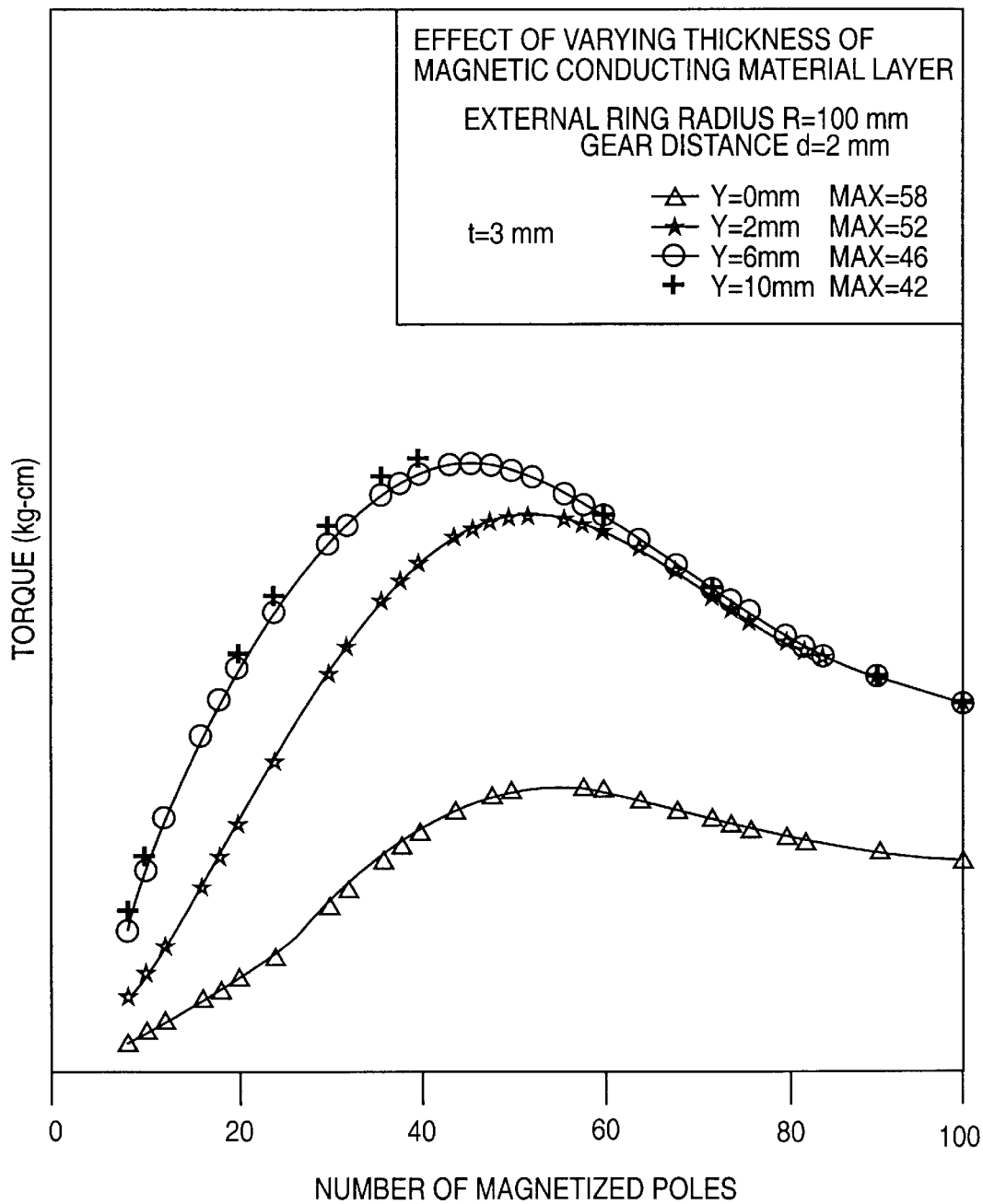
FIG. 2 is a graph with a series of torque versus number of magnetized pole curves showing the effect of varying the thickness of a magnetic conducting material layer under the conditions of t=3 mm, R=100 mm, d=2 mm for a bi-axial magnetic gear system.

FIG. 2 is a graph with a series of torque versus number of magnetized pole curves showing the effect of varying the thickness Y of the magnetic conducting material layer 14 under the conditions of t=3 mm, R=100 mm, d=2 mm, that is, T=f(Y, M), for bi-axial magnetic gear system under these conditions. As shown in FIG. 2, for whatever thickness the magnetic conducting material layer 14 may be, a maximum torque per number of magnetized poles may be found for each of the respective curve (T-M curve). Therefore, a magnetic gear system having an optimal torque can be obtained by selecting the optimal number of magnetized poles. Results from the research show that the optimal number of magnetized pole is preferably found within 20% of the peak torque in each of the T-M curves. Furthermore, the thickness Y of the magnetic conducting material layer 14 will also affect the magnitude of the torque. FIG. 2 reveals that as the thickness Y increases, the maximum torque significantly increases. However, further increases in the thickness Y have a diminishing increase in the maximum torque.

Next, using, a similar method as described above, the effects of varying the ratio of the external ring radius R over the thickness t of the magnetic material layer 12 and varying the distance d between the magnetic gears 10, on the value of torque T is investigated as follows:

1. When d and Y=const, T=f(R/t, M).

Figure 3:
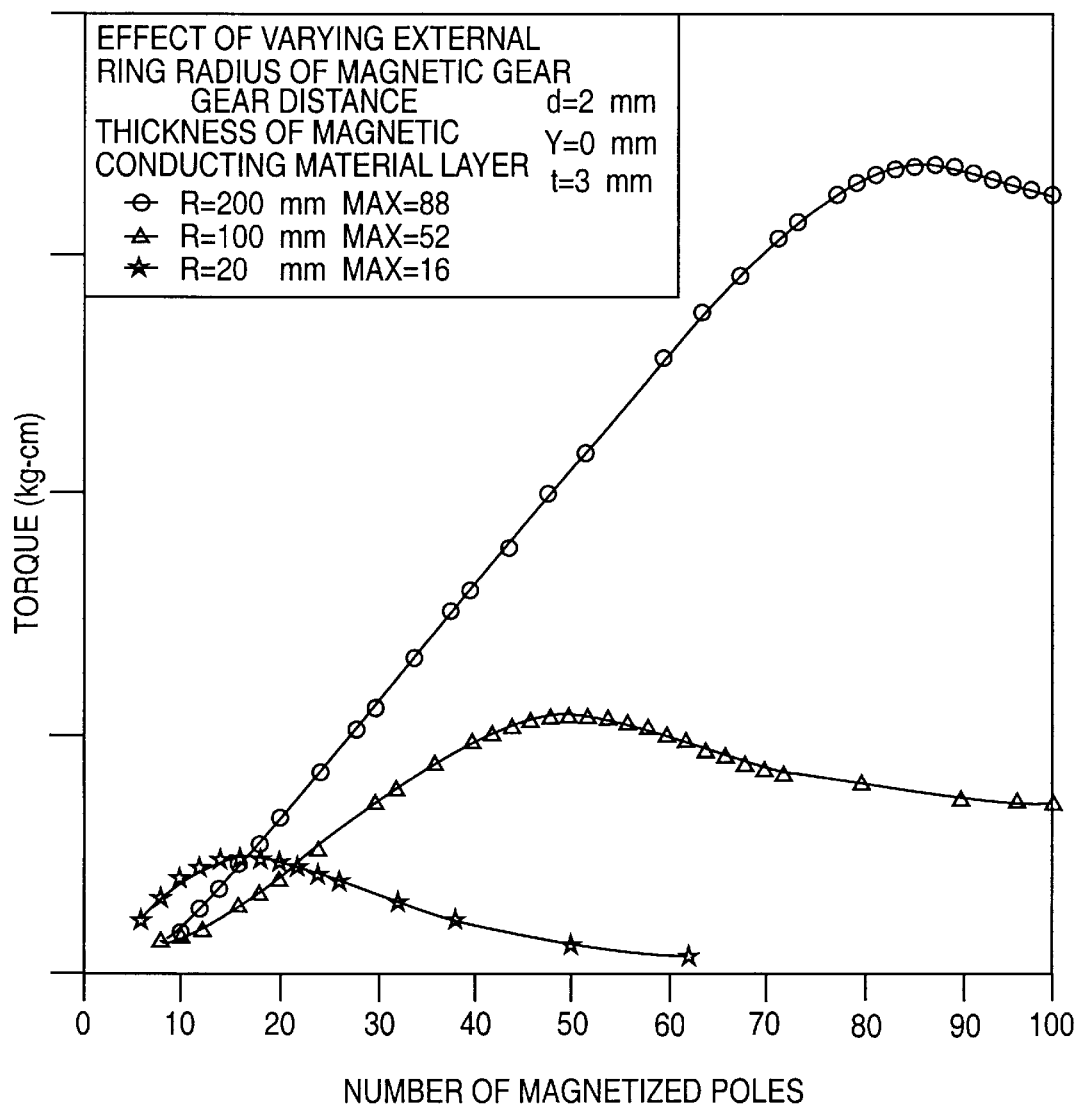
FIG. 3 is a graph with a series of torque versus number of magnetized pole curves showing the effect of varying the radius of the external ring of a magnetic gear under the conditions of t=3 mm, Y=0 mm, d=2 mm for a bi-axial magnetic gear system.

FIG. 3 is a graph with a series of torque versus number of magnetized pole curves showing the effect of varying the external ring radius R of a magnetic gear under the conditions of t=3 mm, Y=0 mm, d=2 mm for a bi-axial magnetic gear system. Similarly, a maximum torque is always found in the T-M curve for each value of external ring radius R of the magnetic gear 10. Therefore, for each selected external ring radius R, a specific number of magnetized poles M that corresponds to a maximum torque T can be found.

2. When R/t and Y=const, T=f(d, M).

Figure 4:
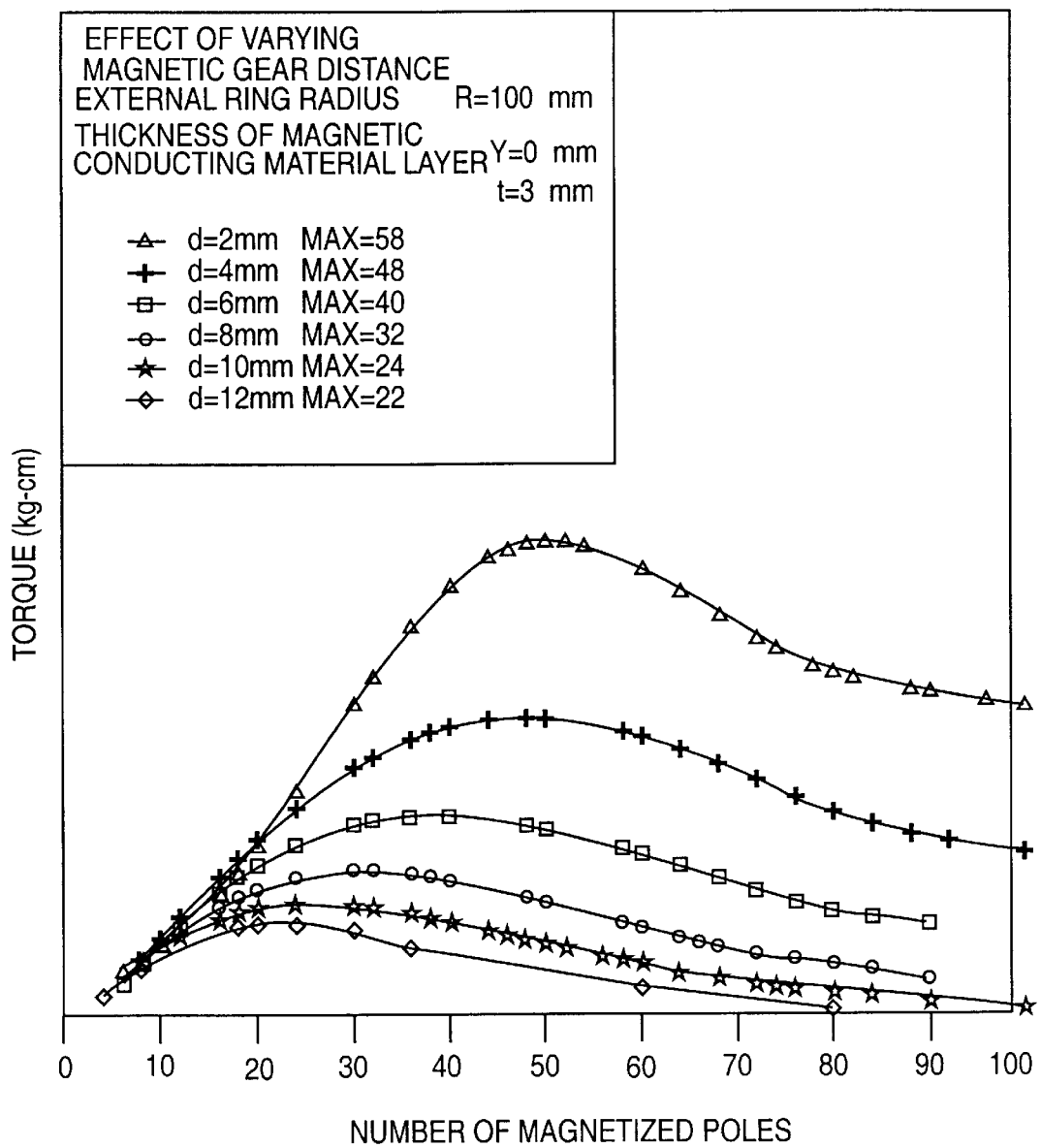
FIG. 4 is a graph with a series of torque versus number of magnetized pole curves showing the effect of varying the gear distance between the magnetic gear under the conditions of t=3 mm, Y=0 mm, R=100 mm for a bi-axial magnetic gear system.

FIG. 4 is a graph with a series of torque versus number of magnetized pole curves showing the effect of varying the gear distance d between the magnetic gear under the conditions of t=3 mm, Y=0 mm, R=100 mm for a bi-axial magnetic gear system. Similarly, a maximum torque is always found in the T-M curve for each distance of separation d between two magnetic gears 10. Therefore, for each distance of separation d, a specific number of magnetized poles M that corresponds to a maximum torque T can be found.

As a conclusion, the above method can be extended to cover the conditions of having a different external ring radius R and a different number of magnetized poles M for a bi-axial magnetic gear system. Research indicates that when the ratio of thickness Y of the magnetic conducting material layer over the thickness t of the magnetic material layer 12 is controlled within certain limits, preferably between 0.5<Y/t<2.5, an optimized design for torque versus number of magnetized poles can be obtained.

Figure 5:
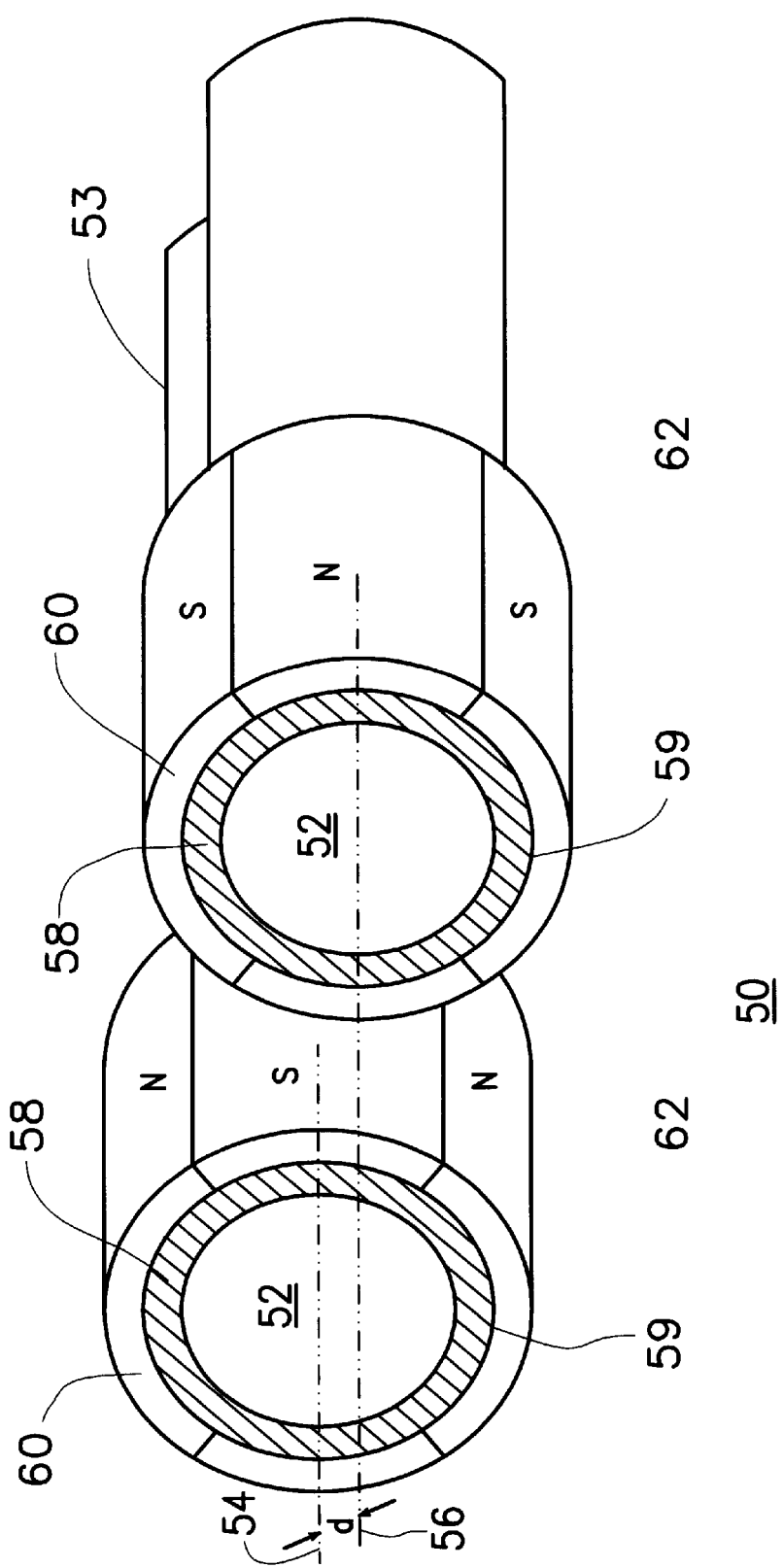
FIG. 5 is a perspective view of the bi-axial magnetic gear system designed according to the optimization method of this invention.

FIG. 5 is a perspective view of a bi-axial magnetic gear system designed according to the optimization method of this invention. The magnetic gear system 50 includes two magnetic gears 52 and two transmission shafts 53 along two different axes 54 and 56. Each magnetic gear 52 slides into its respective transmission shaft and torque is transmitted through rotation. Each magnetic gear 52 comprises a magnetic conducting material layer 58 and a magnetic ring 60. The magnetic conducting material layer 58 can be formed, for example, by casting soft magnetic material with a high magnetic conductance coefficient, such as pure iron, around an internal perimeter 59 of the magnetic ring 60, such that the magnetic conducting material layer 58 is located between the magnetic ring 60 and the transmission shaft. The magnetic ring 60 is constructed from a hard magnetic material, for example, a magnetic compound known as neodymium iron boron (NdFeB). The hard magnetic material in the magnetic ring 60 is then magnetized into an even number of magnetic poles 62 optimized for torque through a factor analysis as previously discussed. Four magnetic poles 62 are shown in FIG. 5 as an example. The factors included in the analysis are, for example, the ratio of the external ring radius R of the magnetic gears 52 over the thickness Y of the magnetic ring 60, thickness t of the magnetic conducting material layer 58 and distance d between the magnetic gears 52. In addition, the two transmission shafts are each supported by a bearing (not shown in the Fig.) and the bearing is in turn enclosed within an aluminum base plate (also not shown in the Fig.).

Although spur (gears are shown in the above illustration of how to optimize the magnetic gear system according to the preferred embodiment of this invention, the shape of gears are by no means restricted to the above. Other forms of gears such as bevel gears, worm gears or helical gears should be included within the scope of this invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for designing an optimal bi-axial type of magnetic gears system, comprising the steps of:
   (a) providing a non-coaxial magnetic gears system including at least two magnetic gears having a hard magnetic material;
   (b) setting a distance between the magnetic gears and a ratio of an external ring radius of the magnetic gear over a thickness of the hard magnetic material layer of the magnetic gears;
   (c) finding a peak value of a torque versus a number of magnetized pole curve for the hard magnetic material used;
   (d) optimizing the magnetic gears system to obtain an optimal torque by magnetizing an optimal number of magnetic poles on the magnetic gears; and
   (e) varying the distance between the magnetic gears and the ratio of the external ring radius over the thickness of the hard magnetic material layer separately, and then repeating the procedures as described in steps (c) to (e).

2. The method of claim 1, wherein the magnetic gears are spur gears, bevel gears, worm gears or helical gears.

3. The method of claim 1, wherein the hard magnetic material includes a neodymium iron boron compound.

4. The method of claim 1, wherein the optimal number of magnetic poles is found within 20% from the peak value of the torque versus the number of magnetized pole curves.

5. A method for designing an optimal bi-axial type of magnetic gears system, comprising the steps of
   (a) providing a non-coaxial magnetic gears system including at least two magnetic gears having a hard magnetic material;
   (b) setting a distance between the magnetic gears and a ratio of an external ring radius of the magnetic gears over a thickness of a hard magnetic material layer of the magnetic gears;
   (c) casing a magnetic conducting material layer around an internal perimeter of the magnetic gears;
   (d) drawing a series of torque versus a number of magnetized pole curves, each having a peak value, by varying the thickness of the magnetic conducting material layer;
   (e) optimizing the magnetic gears to obtain an optimal torque by magnetizing an optimal number of magnetic poles on the magnetic gears; and
   (f) varying the distance between the magnetic gears and the ratio of the external ring radius over the thickness of the hard magnetic material layer separately, and then repeating the procedures as described in steps (c) to (e).

6. The method of claim 5, wherein the magnetic gears are spur gears, bevel gears, worm gears or helical gears.

7. The method of claim 5, wherein the hard magnetic material includes a neodymium iron boron compound.

8. The method of claim 5, wherein a ratio of the thickness of the conducting material layer over the thickness of hard magnetic material layer is controlled within the range of 0.5 and 2.5.

9. The method of claim 5, wherein the conducting magnetic material is a soft magnetic material with a high magnetic conductance coefficient.

10. The method of claim 9, wherein the soft magnetic material includes pure iron.

11. The method of claim 5, wherein the optimal number of magnetized poles is found within 20% from the peak value of the torque versus the number of magnetized pole curves.

* * * * *

UNITED STATES PATENT AND TRADEMARK OFFICE
CERTIFICATE OF CORRECTION

PATENT NO.: 6,047,456

DATED: April 11, 2000

INVENTOR(S): Yeong-Der Yao, Chia-Ming Lee, Shyh-Jier Wang, Der-Ray Huang

It is certified that an error appears in the above-identified patent and that said Letters Patent is hereby corrected as shown below:

In Claim 1, col. 5, line 27, "curve" should read --curves--.

Signed and Sealed this

Twentieth Day of March, 2001

Attest:

NICHOLAS P. GODICI

Attesting Officer

Acting Director of the United States Patent and Trademark Office